(12) United States Patent
Banerji et al.

(10) Patent No.: US 8,549,452 B2
(45) Date of Patent: Oct. 1, 2013

(54) METHOD FOR SUPPORTING MULTIPLE LIBRARIES CHARACTERIZED AT DIFFERENT PROCESS, VOLTAGE AND TEMPERATURE POINTS

(75) Inventors: Revanta Banerji, Beacon, NY (US); Soroush Abbaspour, Ossining, NY (US); Peter Feldmann, New York, NY (US); Hemlata Gupta, Hopewell Jct., NY (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 12/774,766

(22) Filed: May 6, 2010

(65) Prior Publication Data

US 2011/0276933 A1 Nov. 10, 2011

(51) Int. Cl.
    *G06F 17/50* (2006.01)
(52) U.S. Cl.
    USPC ........................................................ 716/111
(58) Field of Classification Search
    USPC ........................ 716/102, 106, 108–115, 136
    See application file for complete search history.

(56) References Cited

U.S. PATENT DOCUMENTS

| | | | |
|---|---|---|---|
| 6,018,497 A * | 1/2000 | Gunasekera | 367/72 |
| 6,523,149 B1 * | 2/2003 | Mehrotra et al. | 716/122 |
| 6,799,153 B1 * | 9/2004 | Sirichotiyakul et al. | 703/19 |
| 6,820,048 B1 * | 11/2004 | Bhutani et al. | 703/15 |
| 8,201,121 B1 * | 6/2012 | Sankaralingam et al. | 716/109 |
| 2003/0083856 A1 * | 5/2003 | Yoshimura et al. | 703/18 |
| 2003/0145296 A1 * | 7/2003 | Chandra et al. | 716/6 |
| 2003/0204817 A1 * | 10/2003 | Kashyap | 716/1 |
| 2007/0011643 A1 * | 1/2007 | Wang et al. | 716/18 |
| 2007/0083838 A1 * | 4/2007 | Wang et al. | 716/10 |
| 2008/0133202 A1 * | 6/2008 | Tseng et al. | 703/14 |

OTHER PUBLICATIONS

Shure, Loren, "Piecewise Linear Interpolation", Aug. 25, 2008, http://blogs.mathworks.com/loren/2008/08/25/piecewise-linear-interpolation/.*

* cited by examiner

*Primary Examiner* — Vuthe Siek
*Assistant Examiner* — Aric Lin
(74) *Attorney, Agent, or Firm* — H. Daniel Schnurmann

(57) ABSTRACT

A method for accurately performing a timing, power, and noise analysis by pre-processing the characterization points of the available libraries, storing time consuming parts of the analysis and utilizing the pre-processed information during active runs to calculate the attributes at a desired PVT point. The PVT space is preferably sub-divided into triangular or rectangular regions, preferably obtained using Delaunay triangulation. In one embodiment, the invention performs an up-front pre-processing step on the characterized libraries to compute the static portion of the interpolation function that is independent of the specific instance; and a coefficient matrix that allows for interpolation of specific instances.

20 Claims, 5 Drawing Sheets

Static portion of interpolation based on PVT of boundary libraries $$H_{static} = \begin{bmatrix} 1 & V_1 & T_1 & P_1 \\ 1 & V_2 & T_2 & P_2 \\ 1 & V_3 & T_3 & P_3 \\ 1 & V_4 & T_4 & P_4 \end{bmatrix}^{-1}$$

Multipliers for boundary libraries $$[c_1 \ldots c_4] = [1 \ V_{req} \ T_{req} \ P_{req}] H_{static}$$

Final delay = $c_1 D_1 (\mathit{InSlew}, C_{load})$ +
$c_2 D_2 (\mathit{InSlew}, C_{load})$ +
$c_3 D_3 (\mathit{InSlew}, C_{load})$ +
$c_4 D_4 (\mathit{InSlew}, C_{load})$ +

FIG. 3a
(PRIOR ART)

Delay Table

| InSlew↓ \ CLoad→ | | | | |
|---|---|---|---|---|
| 2.9 | 2.75 | 2.5 | 2.2 | |
| 2.8 | 2.5 | 2.3 | 2.1 | |
| 2.4 | 2.3 | 2.2 | 2 | |
| 2 | 1.9 | 1.7 | 0.5 | |

Waveform Table (InSlew vs CLoad, waveform icons)

Slew Table

| InSlew↓ \ CLoad→ | | | | |
|---|---|---|---|---|
| 1.9 | 1.75 | 1.5 | 1.2 | |
| 1.8 | 1.5 | 1.3 | 1.1 | |
| 1.4 | 1.3 | 1.2 | 1 | |
| 1 | 1.9 | 1.7 | 0.5 | |

Pin Cap

| InSlew↓ \ CLoad→ | | | | |
|---|---|---|---|---|
| 4.9 | 4.75 | 4.5 | 4.1 | |
| 4.8 | 4.5 | 4.3 | 4.1 | |
| 4.4 | 4.3 | 4.2 | 4 | |
| 4 | 3.9 | 3.7 | 3.5 | |

FIG. 3b
(PRIOR ART)

DELAY — SLEW — WAVEFORM — PIN-CAPS — POWER — NOISE

Static portion of interpolation based on PVT of boundary libraries $$H_{static} = \begin{bmatrix} 1 & V_1 & T_1 & P_1 \\ 1 & V_2 & T_2 & P_2 \\ 1 & V_3 & T_3 & P_3 \\ 1 & V_4 & T_4 & P_4 \end{bmatrix}^{-1}$$

Multipliers for boundary libraries $$[c_1 \ \dots \ c_4] = [1 \ V_{req} \ T_{req} \ P_{req}] H_{static}$$

$Final\ delay = c_1 D_1(InSlew, C_{load}) +$
$c_2 D_2(InSlew, C_{load}) +$
$c_3 D_3(InSlew, C_{load}) +$
$c_4 D_4(InSlew, C_{load}) +$

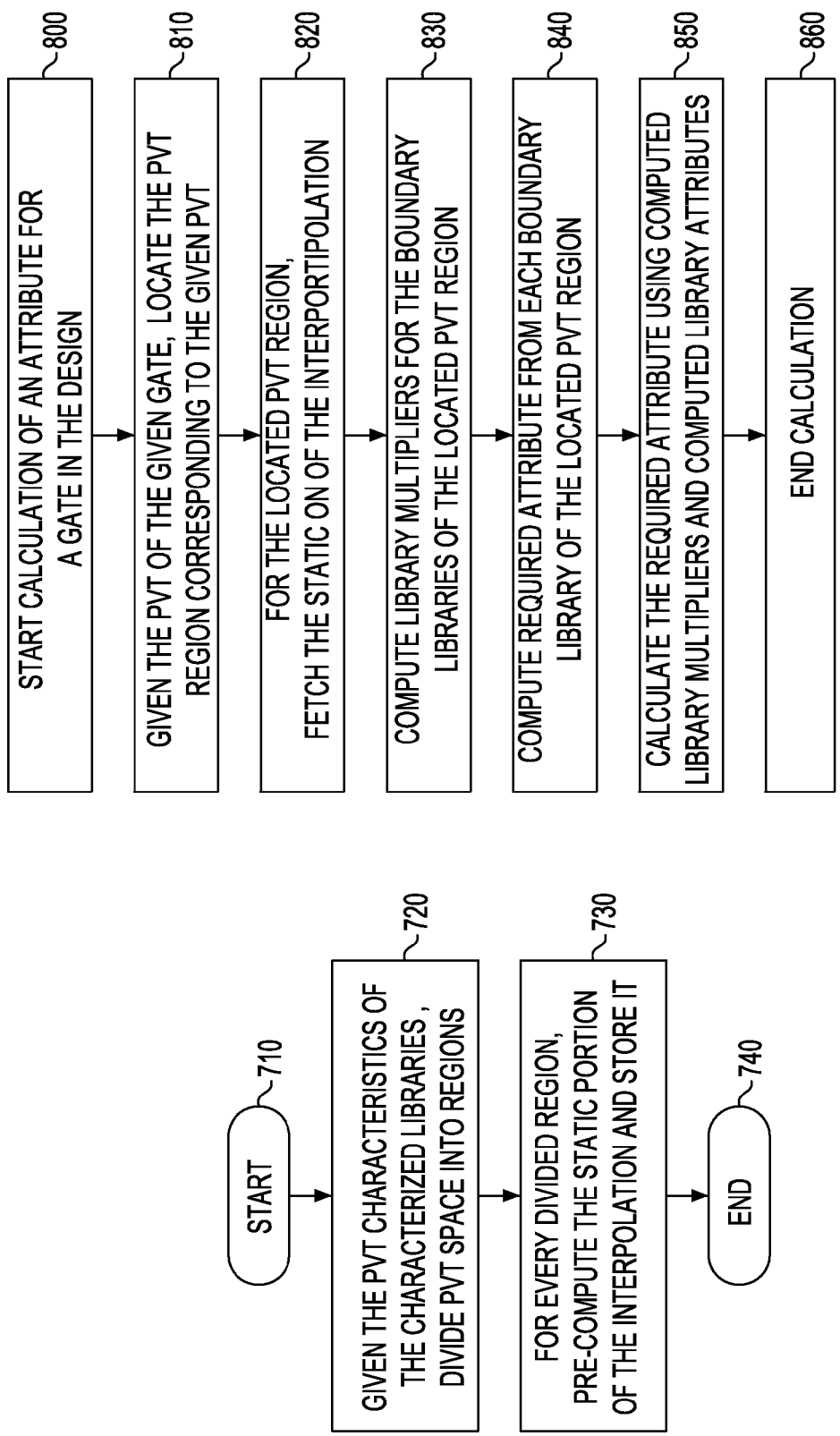

METHOD FOR SUPPORTING MULTIPLE LIBRARIES CHARACTERIZED AT DIFFERENT PROCESS, VOLTAGE AND TEMPERATURE POINTS

FIELD OF THE INVENTION

The invention relates generally to design automation of Very Large Integrated Circuits (VLSI), and more particularly to a system and method for efficient handling of multiple libraries characterized at different process, voltage, and temperature points.

BACKGROUND OF THE INVENTION

Timing, noise, and power (TNP) analysis are crucial engines prior to signing-off a VLSI chip to manufacturing by performing a timing analysis to verify timing correctness, a noise analysis to determine the coupling effect of neighboring nets on a victim net in order and to verify that the glitch noise engine at the input of a sequential circuit, such as a flip-flop, does not impact its functionality. Added to these it should include a power analysis engine to compute the power consumption of the circuit to validate that power consumption of the chip to be less than a specified value set by the technology. Timing, noise, and power analysis are not independent of each other. For instance, power analysis results affect the timing results; the timing affects the noise, and the like. Accordingly, accurate timing, noise and power analysis is inevitable.

VLSI circuits consist of two major components, i.e., gates and corresponding interconnects. A nonlinear analysis is mainly used to achieve an accurate gate level analysis, while interconnects are generally modeled using linear elements, such as resistance, capacitance, and inductance. Several techniques exist to handle the linear interconnect analysis, the more relevant focusing on the gate level analysis.

To achieve accurate gate timing, noise, and power analyses, a gate timing, noise, and power libraries are required, typically characterized by Spice simulations that encompass the circuits under different conditions. Typical cell libraries include some of the most relevant cell attributes such as: delay/slew tables which are characterized and stored as function of input slew and output capacitive load; pin-cap; noise rejection curves, power related information, and the like. Recently, a more accurate current source modeling (CSM) has been advanced as an alternate modeling methodology. In addition to the traditional library data, a typical CSM based cell library includes additional attributes such as voltage/current waveform tables which are characterized and stored as function of input slew and output capacitive load; slew and output load dependent pin-caps; DC current tables characterized as a function of input voltage and output voltage and the like. Therefore, a more advanced CSM modeling paradigm requires significantly more memory resources compared to existing methodologies.

As process technologies scale down towards nanometer technology nodes, variability becomes a major concern in the design of VLSI circuits. Therefore, variability aware design automation tools (e.g. statistical static timing analysis tools) are required to accurately predict the behavior of the VLSI circuits. To perform process and environmental variation sensitive gate level analysis, and multiple libraries necessitate to be characterized at several processes, voltage, and temperature points. During a gate level analysis, the process, voltage, and temperature values of the each instance usage may differ from existing characterized libraries. Therefore, it becomes necessary to perform accurate and efficient gate level analysis, using the aforementioned characterized libraries.

Referring now to FIG. 1, a typical sample circuit is illustrated consisting of gates, 100, 101, 102, etc. and their respective interconnects, 103 and 104, and the like. To perform a timing analysis on the circuit, voltage signals 105 at the primary input pins 106 are propagated through the gates and interconnects until they reach the primary output pin 107 of the circuit. To perform a timing analysis, STA computes and propagates the timing quantities, such as voltage signal's arrival time, required arrival time, slew, and slack at every point of the timing graph.

Referring to FIG. 2, the circuit is illustrated having two instances of a same cell type at different voltage, temperature, and process variation setting. For instance, gate A 201 and gate B 202, are assumed to be the same cell type, e.g., a buffer. However, their respective voltage, temperature, input slew, and output load could be different. To perform an accurate timing analysis, it becomes necessary to determine how the timing behavior of the cells changes when the input slew, output load, process, voltage and temperature vary.

Referring to FIG. 3a, a typical timing library is shown consisting of a characterized input slew and an output load dependent non-linear delay, slew, voltage/current waveform tables for all the timing arcs of the cell. Also included are slew and load dependent pin-cap tables corresponding to the input pins of the gate. Given a value of input slew and output load during static timing analysis, a timer would extract an accurate delay, slew, and the like values from the tables.

Referring to FIG. 3b, a typical library, (also referenced to as LIB/ECSM library) is shown that includes characterized tables for power and noise analysis along with timing related attributes like delay, slew, waveforms, pin-caps, and noise at a given PVT point.

Historically, there have been two distinct methods for Complementary Metal-Oxide Semiconductor (CMOS) gate library characterization to parameterize Process, Voltage and Temperature (PVT) using a first approach that includes lookup tables for delay and slew. Typically, these include discrete process points, and scale factor sensitivities that are provided for variations. The second approach includes using empiric functions that cover more thoroughly the process space, but which require longer characterization time for each process node.

In today's world however, the impact of variations at smaller nodes results in an operating environment too diverse to be covered during characterization. More advanced methods, such as CSM, will allow for predictive techniques to model the gate behavior in diverse operating environments.

The difficulty associated with multiple libraries characterized at different process points resides in requiring the interpolation between them to compute delays, slews, waveforms, and the like. When the operating points require a large number of characterized libraries, a brute force interpolation approach at each instance becomes increasingly inefficient and inaccurate. In the case of CSM models, the inefficiency of interpolation is greater due to its inherent larger model size.

Conventional interpolation and/or extrapolation techniques used to determine the gate timing behavior at a point with predetermined values of process, voltage and temperature (referred hereinafter as PVT point) are mainly categorized in two groups:

Curve fitting that is generated by way of an equation that covers each library attribute for the entire PVT space. This technique has several shortcomings: firstly, some of the library attributes such as slew tables and waveforms tables include related information, therefore, using an independent curve fitting for slew tables and waveform tables can incur in certain inconsistencies in the resulting library at a PVT point. Secondly, the aforementioned technique becomes impractical in the presence of more complex attributes such as voltage and current waveforms as presented in ECSM (Effective Current Source Model) and CCS (Composite Current Source) libraries.

Performing timing, power, and noise analyses at each corner, and later interpolating and/or extrapolating the results achieved during timing/noise/power calculations are CPU intensive when the same operations are performed millions of times during an active run.

SUMMARY OF EMBODIMENTS OF THE INVENTION

Therefore, there is a need in industry to provide an efficient technique to accurately perform timing, power, and noise analyses using pre-processed libraries, storing the time-consuming part of the analysis and utilizing the pre-processed information during active runs to efficiently calculate the attributes at a given PVT point.

In one aspect, the invention describes a method and a system to perform a timing, power, and noise analyses by pre-processing characterization points of available libraries; storing the time consuming portion of the analysis; and applying the pre-processed information during active runs to determine the attributes at desired PVT points of the PVT space sub-divided into triangular or rectangular regions, the triangular sub-division being preferably obtained by applying Delaunay triangulation.

In another aspect, in one embodiment of the invention an up-front pre-processing on the characterized libraries is performed to compute the static portion of the interpolation function that is independent of the specific instance, and applies a coefficient matrix to enable interpolation of specific instances. Computing and storing moves the overhead to the pre-processing rather than affecting the runtime during real delay, slew and waveform computation and removes the burden necessitated by having to evaluate complex equations during a delay/slew/voltage waveform calculation in an active run.

In still another aspect, an embodiment of the invention uses a linear regression to achieve pre-processing, wherein a linear multiplication is advantageously used to interpolate the timing, noise, and power attributes.

In yet another aspect, an embodiment of the invention applies the aforementioned characteristics to timing analysis, wherein derivatives thereof can be extended to include noise and power considerations as well.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings

FIG. 3a illustrates delay, slew, pin-cap, waveform tables for a sample LIB/ECSM library at one PVT point.

FIG. 3b illustrates characterized tables for delay, slew, pin-cap, waveform for timing analysis, power tables for power analysis and noise tables for noise analysis for a sample LIB/ECSM library at one PVT point.

FIGS. 7 and 8 illustrate the flowchart according to an embodiment of the invention.

DETAILED DESCRIPTION OF PREFERRED EMBODIMENTS

Figure 1:
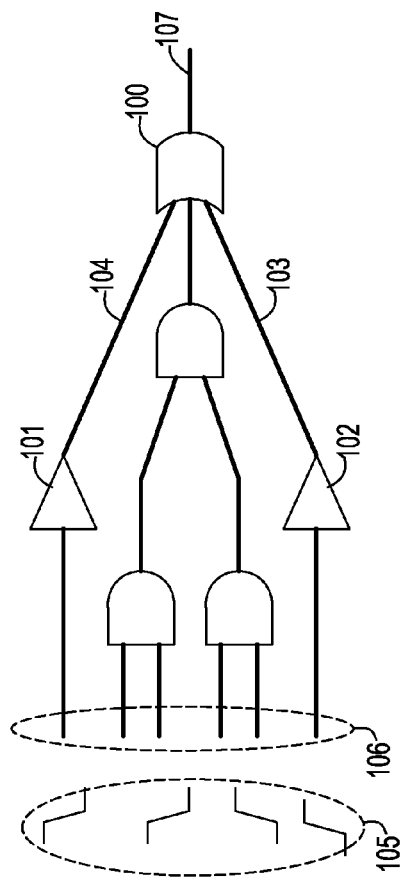
FIG. 1 illustrates a sample VLSI prior art circuit consisting of gates and interconnects.
Figure 2:
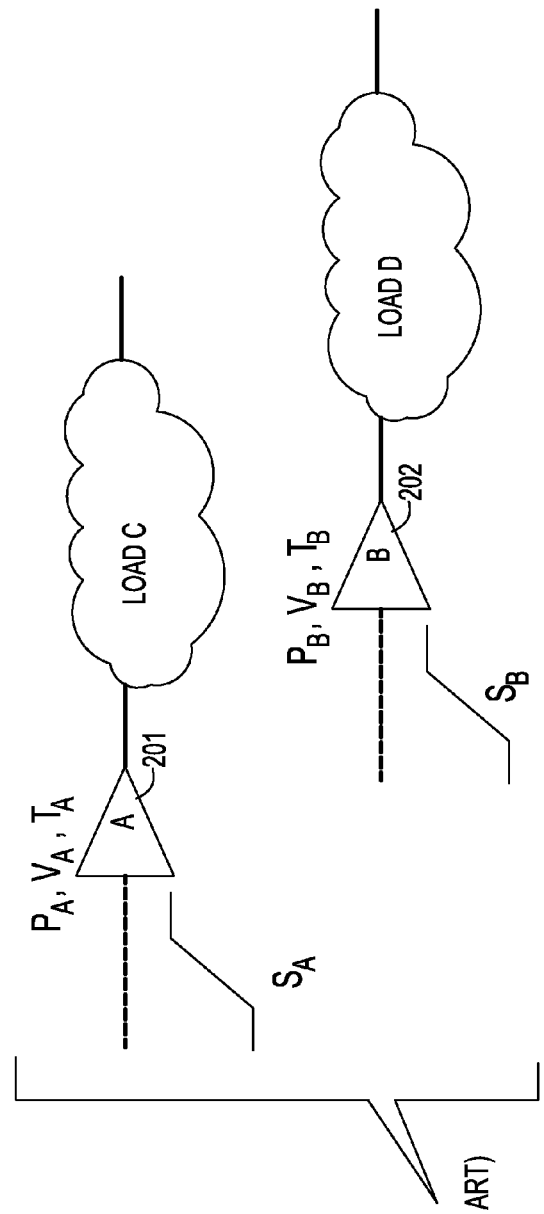
FIG. 2 shows one or more instances of the same cell type in the design at different process, voltage and temperature points and different input slews/arrival times and different output loads.

The present invention will now be described in greater detail by way of the following discussion with reference to the drawings that accompany the present application. It is observed that the drawings of the present application are provided for illustrative purposes only.

In an embodiment, the invention is directed to perform a timing, noise, and power analyses using multiple PVT libraries by dividing the PVT space (PVT points of the characterized libraries) into different regions; for every region, preprocessing and storing a CPU-intensive portion of an interpolation function that is independent of actual chip PVT values and is only dependent on PVT characteristics of characterized libraries; performing an efficient operation using the stored data to compute the analysis attributes needed for timing, noise, and power analysis of specific instances at a desired chip PVT.

Computing the values and storing them moves the overhead to a one-time pre-processing step rather than affecting runtime during real timing, noise and power computation in an active run while preserving the accuracy of interpolation between PVT points. In addition, the invention preserves the dependency of library attributes in the interpolated library.

In order to better explain details of embodiments of the present invention, the input variables to the interpolation are classified in two categories:

a) Static variables, wherein the variables define the characterized library specification and are common for timing/power/noise attributes of the library, such as voltage, temperature, process conditions, and the like, and b) Dynamic variables, wherein the variables are more local to the specific analysis such as input slew and output capacitive load.

Expressed in mathematical terms, if the input slew ($S_{in}$), output capacitive load ($C_l$), power supply voltage setting ($V_{dd}$), temperature (T), and process variable setting (P), are inputs to the interpolation function (F), the interpolation function is separated into two elements, the CPU-expensive static portion ($H_{static}$) and the efficient dynamic portion of the operation ($f_{dynamic}$), wherein the interpolation function F is given by Equation 1:

$$F(P,Vdd,T,S_{in},C_l)=F\{H_{static}\{P,Vdd,T\}, f_{dynamic}(S_{in},C_l)\} \quad (1)$$

Referring now to the procedure to compute the aforementioned $H_{static}$, during library characterization, a library characterization team performs several simulations for each process, voltage, and temperature (PVT) setting and provides timing, noise, and power attributes corresponding to the desired PVT point of one library. At the end of the process, the library team generates the libraries at a given number of PVT points, depending on the customer needs. A tradeoff between the accuracy of timing, noise, power analysis and the number of libraries which are provided exists, namely, the bigger the number of libraries, the higher the accuracy during the timing, noise, power analyses. However, the library characterization is an expensive process.

Figure 4:
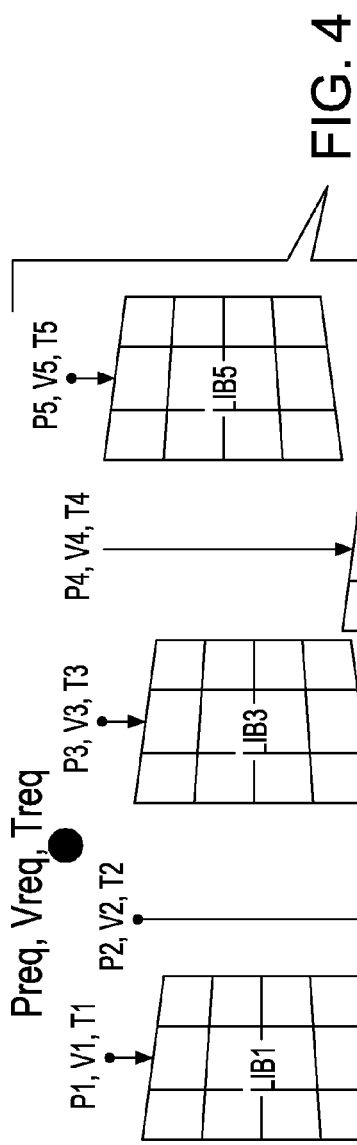
FIG. 4 illustrates available characterized libraries at different PVT points and a point in space where timing analysis is required.

Usually, it is not cost-effective to characterize libraries for more than a limited number of PVT points for every technology, e.g., 10-30 PVT points. In order to predict the timing, noise, and power behavior of a gate at a PVT point different from the characterized libraries, an accurate and efficient interpolation technique is inevitably required. Given the PVT values for the characterized libraries, the following procedure illustrates how to calculate the $H_{static}$, with reference to FIG. 4.

Assuming having a plurality of characterized libraries at PVT points with process, voltage and temperature having values $P_1V_1T_1$ (Lib1), $P_2V_2T_2$ (Lib2), $P_3V_3T_3$ (Lib3), $P_4V_4T_4$ (Lib4) and $P_5V_5T_5$ (Lib5), if one were to calculate at PVT given points, $P_{req}V_{req}T_{req}$ (i.e., points where characterized data is lacking), the following procedure preferably is to use a three-dimensional PVT space, although the inventive method can be applied to both, a two-dimensional and to a three-dimensional space.

Initially, the PVT space of characterized libraries is divided into regions defined by existing PVT points. In one embodiment of the invention, the PVT space can be sub-divided into triangular regions using, for example, a 3D Delaunay triangulation of the given point set. In another embodiment, the PVT space can be sub-divided into rectangular regions, e.g., when the existing point set is already on a rectangular grid, or tetrahedral regions.

Figure 5:
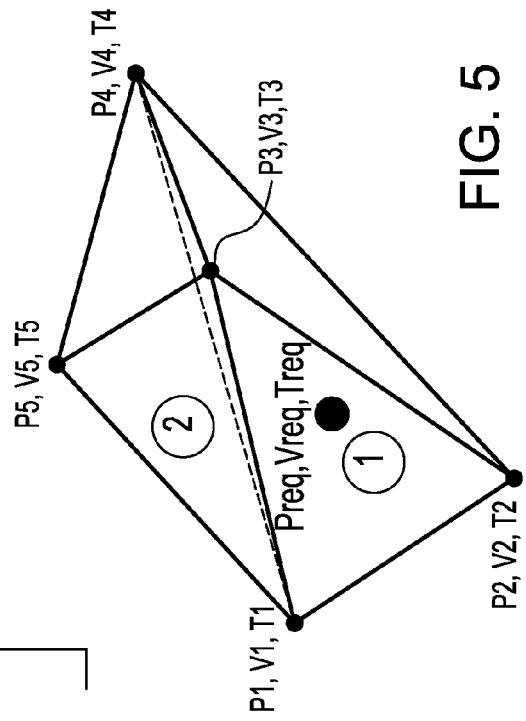
FIG. 5 illustrates the available PVT space divided into different regions.

FIG. 5 illustrates the division of the space into tetrahedral regions. Each tetrahedral region is delimited by four points from the original set. In FIG. 5, two tetrahedral regions are illustrated being delimited by (1, 2, 3, 4) and by (1, 3, 4, 5). Covering the space of interest by tetrahedral regions is not unique, but more effective techniques are needed to obtain coverage with numerically good qualities. Delaunay triangulations maximize the minimum angle of all the angles of the triangles in the triangulation. As such, they avoid 'skinny' triangles and are in this sense, considered to be optimal.

The tetrahedral division of space results in a piecewise-linear interpolation scheme which guarantees continuity over all region boundaries. The value of the functions within each region is given by a linear combination of the values of the points delimiting the tetrahedral region. The actual computation is very efficient since a significant portion of it can be pre-computed.

Figure 6:
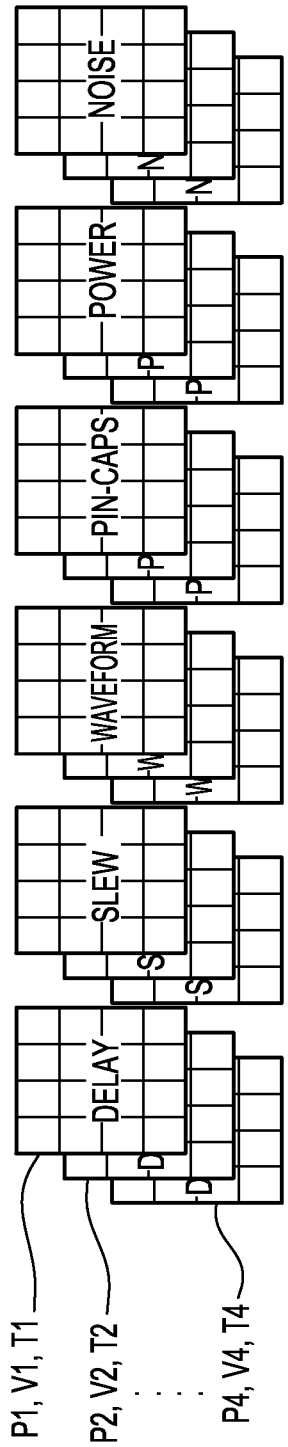
FIG. 6 shows the calculation for the static data for one region and use of the static calculated data in calculation of the interpolated library attribute.

In each region of the sub-divided PVT space, some pre-processing steps based on the characteristics of the boundary libraries are performed, and the output thereof is stored as a property of that region. In one embodiment, as shown in FIG. 6, four libraries characterized at four PVT points $P_1V_1T_1$, $P_2V_2T_2$, $P_3V_3T_3$, and $P_4V_4T_4$, are provided. The $H_{static}$ matrix can be obtained from Equation 2:

$$H_{static} = \begin{bmatrix} 1 & V_1 & T_1 & P_1 \\ 1 & V_2 & T_2 & P_2 \\ 1 & V_3 & T_3 & P_3 \\ 1 & V_4 & T_4 & P_4 \end{bmatrix}^{-1} \quad (2)$$

As shown in the matrix, $H_{static}$ is dependent only on static variables of the characterized libraries at the boundary of the region. Therefore, each region $H_{static}$ is unique and should be calculated for each region. In addition, $H_{static}$ can be highly complex since it is computed once per region, and does so without affecting the runtime of an active run. $H_{static}$ is independent of the other attributes of the characterized library and is only a function of the static variables.

In the case of rectangular space coverage, the interpolation scheme needs to be multi-linear in each rectangular region in order to maintain the continuity of the models. In a 3D case, each rectangle has eight vertices that will contribute to the interpolation function, as shown with reference to Equation 3:

$$H_{static} = \begin{bmatrix} 1 & V_1 & T_1 & P_1 & V_1T_1 & V_1P_1 & T_1P_1 & V_1T_1P_1 \\ 1 & & & & & & & \\ 1 & & & & & & & \\ 1 & & & & & & & \\ 1 & & & & & & & \\ 1 & & & & & & & \\ 1 & & & & & & & \\ 1 & V_8 & T_8 & P_8 & V_8T_8 & V_8P_8 & T_8P_8 & V_8T_8P_8 \end{bmatrix}^{-1} \quad (3)$$

In order to perform a timing analysis in an active run, for every instance in the design, the PVT of each instance in the PVT space is first located, and is then multiplied by the pre-computed $H_{static}$. Since multiplication is an efficient operation and the CPU-extensive $H_{static}$ operation is computed once, not only the required accuracy is being preserved, but also the operation is being efficiently performed during static timing. For example, if the PVT of an instance is Preq, Vreq, and Treq, and it is located in a first region of the PVT space, the instance delay as a function of given input slew ($S_{in}$), and output load ($C_l$), can be calculated using Equation 4:

$$\text{Delay}_{req}(Sin,C_l)=c_1\text{Delay}_1(Sin,C_l)+c_2\text{Delay}_2(Sin,C_l)+ \\ c_3\text{Delay}_3(Sin,C_l)+c_4\text{Delay}_4(Sin,C_l) \text{ wherein} \\ [c_1c_2c_3c_4]=[1\ V_{req}T_{req}P_{req}]H_{static}^{cached} \quad (4)\ (4)$$

Delay1 is the delay of the gate for the given Sin, and $C_l$ at $P_1V_1T_1$; Delay2 is the delay of the gate for the given Sin and $C_l$ at $P_2V_2T_2$; Delay3 is the delay of the gate for the given Sin and $C_l$ at $P_3V_3T_3$; and Delay4 is the delay of the gate for the given Sin and Cl at $P_4V_4T_4$. The Delay at each library can be calculated using conventional multi-linear interpolation. Note that $C_1$, $C_2$, $C_3$ and $C_4$ are only dependent on the PVT of the instance and $H_{static}$ and are independent from any dynamic attributes of the libraries. Therefore, they can be used to multiply other attributes of timing, noise, and power analyses, as well. For instance, the same $C_1$, $C_2$, $C_3$ and $C_4$ can be used to interpolate between output slews, waveforms, and pin-caps, etc. of the libraries. Alternatively, the interpolated pin-caps for the instance at $P_{req}V_{req}T_{req}$ are computed by Equation 6:

$$\text{Pincap}_{req}(Sin,C_l)=c_1\text{Pincap}_1(Sin,C_l)+c_2\text{Pincap}_2(Sin, \\ C_l)+c_3\text{Pincap}_3(Sin,C_l)+c_4\text{Pincap}_4(Sin,C_l) \quad (6)$$

Pincap1 is the pin-cap of the gate for the given Sin and $C_l$ at $P_1V_1T_1$; pincap2 is the pin-cap of the gate for the given Sin and $C_l$ at $P_2V_2T_2$; pincap3 is the pin-cap of the gate for the given Sin and $C_l$ at $P_3V_3T_3$; and pincap4 is the pin-cap of the gate for the given Sin and $C_l$ at $P_4V_4T_4$. Pin-cap at each library can be calculated using conventional multi-linear interpolation.

In the case of a rectangular division of the space the interpolating function will be multi-linear. The actual value will be linear combination of the eight corners of the region.

$$[c_1 c_2 \ldots c_8] = [1 V_{req} T_{req} P_{req} V_{req} T_{req} V_{req} P_{req} V_{req} T_{req} P_{req}] H_{static}^{cached} \quad (7)$$

Referring to FIG. 7, a flow chart is shown illustrating an embodiment of the invention. The steps are executed preferably once during the timing run since the steps are independent of the required voltage, temperature and process points at instances of the cells existing in the design.

Given the PVT characteristics of the characterized libraries, step 720 divides PVT space into regions. Step 730 computes the static portion of the Interpolation and stores it for use in the later steps.

Referring to FIG. 8, the steps used to perform an efficient operation are illustrated that allows for interpolation of specific instances using stored information.

Given the PVT of a gate, step 810 locates the PVT region that encompasses the given PVT. Step 820 fetches the $H_{static}$ for the PVT region located from the cache that was populated in step 730. Given the PVT of the gate and $H_{static}$ of the region, step 830 determines the library multipliers for the boundary libraries. For each boundary required, attributes are computed in step 840. After computing the library multipliers and the attributes for each boundary library, step 850 multiplies the coefficients obtained from step 830 with the attributes obtained from step 840, and sums the results to determine the attribute required at the given PVT point.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out the methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method of improving a performance of a VLSI chip design by performing a timing, noise, and power analysis using multiple process, voltage, and temperature (PVT) characterized libraries, the method comprising:
   a. using a computer, dividing a PVT space of the characterized libraries into a plurality of regions defined by existing PVT points;
   b. pre-processing for each of said regions a static portion of an interpolation function dependent on properties of the characterized libraries and storing the static portion of the interpolation function;
   c. using the static portion of the interpolation function for different combinations of parameters subjected to predetermined conditions; and
   d. computing timing, noise, and power attributes at selected process settings using the stored static portion and attributes from the characterized libraries and results of the different combinations of the parameters.

2. The method as recited in claim 1, wherein the PVT space is divided into triangular regions.

3. The method as recited in claim 1, wherein the PVT space is divided into tetrahedral regions.

4. The method as recited in claim 2, wherein the PVT space is divided into rectangular regions.

5. The method as recited in claim 2, wherein the PVT space is divided into hyper-rectangular regions.

6. The method as recited in claim 1, wherein the pre-processing is performed by linear regression.

7. The method as recited in claim 1, wherein step d) is performed using a linear multiplication.

8. The method as recited in claim 1 wherein the sub-division of space results in a piecewise-linear interpolation providing continuity over all region boundaries.

9. The method as recited in claim 1 further comprising applying pre-processed information during active runs for determining said attributes at predetermined PVT points, when said PVT space is sub-divided.

10. The method as recited in claim 2, wherein a Delaunay triangulation is utilized for dividing the PVT space into triangles.

11. The method as recited in claim 3, wherein the Delaunay tetrahedralization is utilized for dividing the PVT space into tetrahedral regions.

12. The method as recited in claim 1, where said PVT space includes any process and environmental sources of variations.

13. The method as recited in claim 1 wherein the timing attributes include delays, slews, pin capacitance, limits, timing constraints, voltage waveforms and current waveforms.

14. The method as recited in claim 1 wherein the power attributes includes static power, dynamic power and leakage power.

15. The method as recited in claim 1 wherein the noise attribute includes current waveforms, pin capacitance, noise rejection curves, propagated noise, noisy resistance, and quiet resistance.

16. The method as recited in claim 1 wherein the static portion of an interpolation function is dependent on the process, voltage and temperature (PVT) of the characterized libraries at a region periphery.

17. The method as recited in claim 16, wherein input slew ($S_{in}$), output capacitive load ($C_l$), supply voltage setting ($V_{dd}$), temperature (T), and process variable setting (P), are inputs to an interpolation function (F), and wherein the interpolation function is divided into a static portion ($H_{static}$), and a dynamic portion of the operation ($f_{dynamic}$), the interpolation function being determined by equation: $F(P, V_{dd}, T, S_{in}, C_l) = F\{H_{static}\{P, V_{dd}, T\}, f_{dynamic}(S_{in}, C_l)\}$.

18. The method as recited in claim 17, wherein an instance delay is a function of the input slew ($S_{in}$), and the output capacitive load ($C_l$) determined by equation:

$$\text{Delay}_{req}(Sin, C_l) = c_1 \text{Delay}_1(Sin, C_l) + c_2 \text{Delay}_2(Sin, C_l) + c_3 \text{Delay}_3(Sin, C_l) + c_4 \text{Delay}_4(Sin, C_l) \text{ wherein}$$
$$[c_1\ c_2\ c_3\ c_4] = [1\ V_{req}\ T_{req}\ P_{req}] H_{static}^{cached}$$

and wherein Delay1 is a delay of a gate for the Sin, and $C_1$ at $P_1V_1T_1$; Delay2 is the delay of the gate for the Sin and $C_1$ at $P_2V_2T_2$; Delay3 is the delay of the gate for the Sin and $C_1$ at $P_3V_3T_3$; and Delay4 is the delay of the gate for the Sin and C1 at $P_4V_4T_4$, and wherein $C_1, C_2, C_3$ and $C_4$ are dependent on PVT and $H_{static}$ and are independent from dynamic attributes of the libraries.

19. The method as recited in claim 18, wherein interpolated pin-caps for an instance at $P_{req}V_{req}T_{req}$ are determined for every instance in the design, the PVT of each instance in the PVT space being located, and then multiplied by pre-computed $H_{static}$, and wherein the PVT of the instance at said $P_{req}$, $V_{req}$, and $T_{req}$ is determined by equation:

$$Pincap_{req}(Sin, C_l) = c_1 Pincap_1(Sin, C_l) + c_2 Pincap_2(Sin, C_l) + c_3 Pincap_3(Sin, C_l) + c_4 Pincap_4(Sin, C_1)$$

wherein Pincap1 is a pin-cap of the gate for the Sin and $C_1$ at $P_1V_1T_1$; pincap2 is the pin-cap of the gate for the Sin and $C_1$ at $P_2V_2T_2$; pincap3 is the pin-cap of the gate for the Sin and $C_1$ at $P_3V_3T_3$; and pincap4 is the pin-cap of the gate for the Sin and $C_1$ at $P_4V_4T_4$. Pin-cap at each library can be calculated using conventional multi-linear interpolation.

20. A non-transitory program storage device readable by a machine, tangibly embodying a program of instructions executable by the machine to perform method steps of improving a performance of a VLSI chip design by performing a timing, noise, and power analysis using multiple process, voltage, and temperature (PVT) characterized libraries, the method steps comprising:
  a. using a computer, dividing a PVT space of the characterized libraries into a plurality of regions defined by existing PVT points;
  b. pre-processing for each of said regions a static portion of an interpolation function dependent on properties of the characterized libraries, and storing the static portion of the interpolation function;
  c. using the static portion of the interpolation function for different combinations of parameters subjected to predetermined conditions; and
  d. computing timing, noise, and power attributes at selected process settings using the stored static portion and attributes from the characterized libraries and results of the different combinations of the parameters.

* * * * *